United States Patent [19]
Case
[11] 3,927,470
[45] Dec. 23, 1975

[54] METHOD OF MAKING MULTI TRACK MAGNETIC TRANSDUCING HEADS

[76] Inventor: Derek Frank Case, 122 Cadbury Road, Sunbury on Thames, England

[22] Filed: Dec. 7, 1973

[21] Appl. No.: 422,685

[30] Foreign Application Priority Data

Dec. 29, 1972 United Kingdom .............. 60151/72

[52] U.S. Cl. .................. 29/603; 360/103; 360/122; 360/127

[51] Int. Cl. ............................................. H01f 7/06

[58] Field of Search ...... 29/603; 360/103, 122, 125, 360/127

[56] References Cited

UNITED STATES PATENTS

| | | | |
|---|---|---|---|
| 3,384,954 | 5/1968 | Bradford et al. | 29/603 |
| 3,534,470 | 10/1970 | Faure et al. | 29/603 |
| 3,601,871 | 8/1971 | Pierce | 29/603 |
| 3,613,228 | 10/1971 | Cook et al. | 29/603 |
| 3,737,992 | 6/1973 | Braun et al. | 29/603 |

*Primary Examiner*—Carl E. Hall

[57] ABSTRACT

Magnetic heads are made in groups by bonding ferrite elements to a non magnetic support to provide an assembly of parallel ferrite elements. The elements are machined to a required form. After which the assembly is divided transversely of the length of the elements into a plurality of members each having a plurality of shaped ferrite pieces in spaced parallel relationship.

7 Claims, 6 Drawing Figures

METHOD OF MAKING MULTI TRACK MAGNETIC TRANSDUCING HEADS

BACKGROUND OF THE INVENTION

This invention relates to the manufacture of magnetic recording heads.

In the manufacture of cores from ferrite material for magnetic recording heads, the ferrite is shaped to the required form by grinding, sawing and lapping operations. In order to reduce the time and cost of making individual core elements, it is known to machine a block of ferrite so that its cross section is of the same form as the shape of the core elements and then to slice the block along planes parallel to that of the cross section to yield a plurality of individual core elements. For example when it is desired to make a core having generally C shaped elements, two blocks of ferrite are machined to a channel form so that their cross section is of C shape, the blocks are bonded together by the free edges of the channels and then are sliced into individual cores. Furthermore by accurate machining of the blocks, all the cores made from a pair of blocks are of substantially identical shape, whereas if the cores were made individually considerable variation in the cores would be inevitable.

My U.S. Pat. application Ser. No. 3,837,073 discloses a method of manufacturing pole-piece pairs mounted in a carrier by bonding strips of ferrite with a non-magnetic gap therebetween to a non-magnetic support, surrounding the bonded strips with a non-magnetic material and then dividing the resultant structure transversely to produce slices containing ferrite pole piece elements extending through the thickness of the slices. One face of the structure is profiled for co-operation with a magnetic record medium and a magnetic yoke assembly is secured to the other face of the structure to complete the magnetic core.

SUMMARY OF THE INVENTION

According to the invention a method of manufacturing a plurality of magnetic heads includes the steps of assembling a plurality of elongate ferrite elements in spaced parallel relationship by means of one or more non-magnetic supports; machining the assembly so as to shape the ferrite elements to a required form and subsequently dividing the assembly into a plurality of members each having a plurality of shaped ferrite pieces in said spaced relationship.

The width of at least a part of each ferrite element may be reduced by machining a plurality of spaced grooves parallel to the length of the elements so as to remove material from the side or sides of each element. Preferably the grooves are filled with further non-magnetic material in order to support the parts of the ferrite elements of reduced width.

The assembly may be machined tranversely of the elements in order to profile one or both edges of the elements.

BRIEF DESCRIPTION OF THE DRAWINGS

A method of manufacturing magnetic heads embodying this invention will now be described, by way of example, with reference to the accompany drawing in which.

DESCRIPTION OF THE PREFERRED EMBODIMENT

Figure 1:
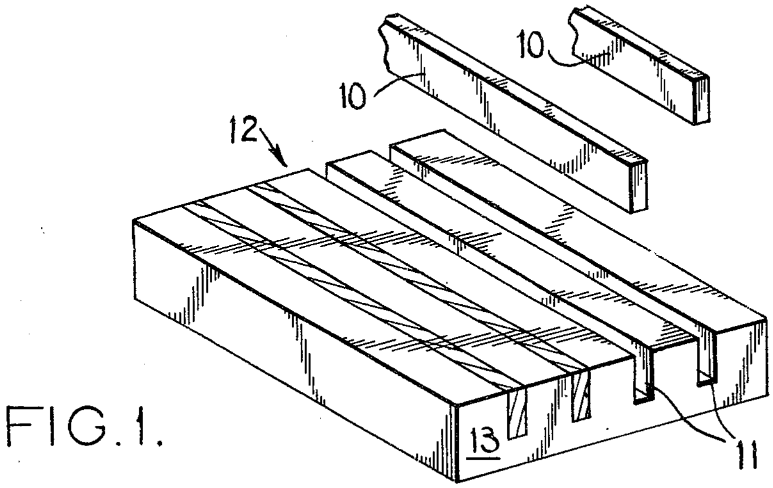
FIG. 1 shows some of the elements from which a multi track head is to be formed.
Figure 2:
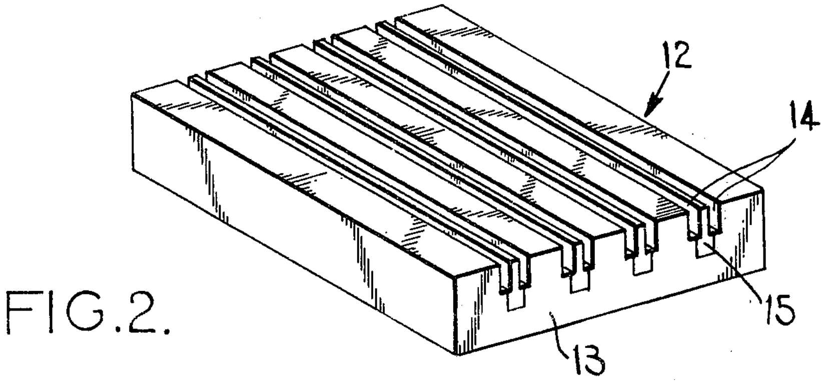
FIG. 2 shows an assembly of ferrite elements in a non-magnetic support after a first machining operation.
Figure 3:
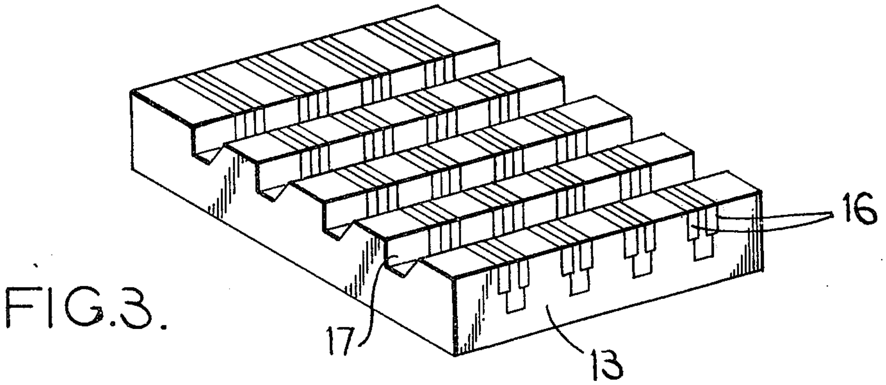
FIG. 3 shows the assembly after a second machining operation.
Figure 4:
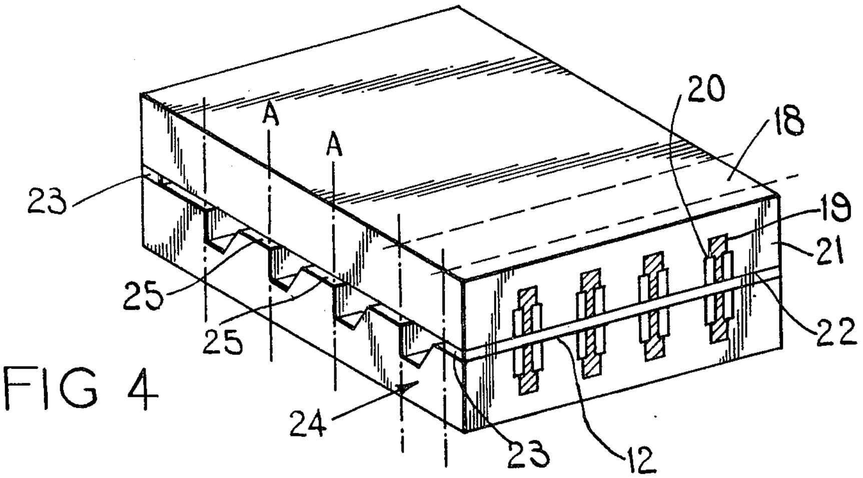
FIG. 4 shows two assemblies bonded together.
Figures 5, 6:
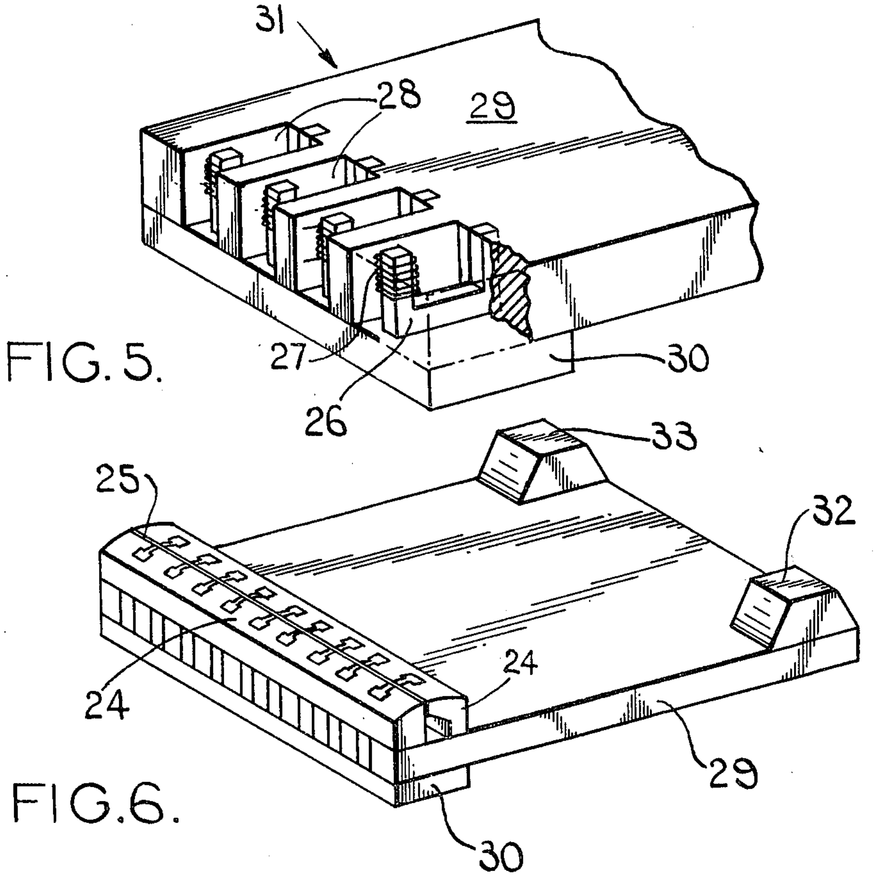
FIG. 5 shows a plurality of ferrite yokes in a support.
FIG. 6 shows a final assembly of a multi track head.

Referring first to FIG. 1, a plurality of ferrite strips 10 are inserted in spaced parallel grooves 11 in one face 12 of a non-magnetic plate 13 which may be of glass or glass ceramic material. The ferrite strips 10 are bonded to the plate 12 by means of glass having a lower melting temperature than the plate 12.

In a first machining operation, a plurality of pairs of parallel grooves 14 are cut in the face 12 of the plate 13 and ferrite strips 10. The pair of grooves 14 are located so as to remove material from each side of the ferrite strips 10. Thus each ferrite strip has a portion 15 of reduced width extending along the length of the strips. The separation between the grooves of the pairs is arranged so that the portion 15 has the desired width. Preferably the grooves are machined simultaneously by a multi ganged tool to ensure that the width of the portions 15 is uniform along their length and that the portions 15 are accurately parallel to one another and accurately pitched relative to one another.

The grooves 14 are filled with non-magnetic material which may be glass which is caused to flow into the grooves or glass ceramic inserts 16 bonded into the grooves.

In a second machining operation parallel grooves 17 are cut which extend transversely of the ferrite strips 10. These grooves 17 are of such a section that the ferrite strips have the profile of a number of pole piece elements joined end to end. The face 12 of the assembly is lapped optically flat.

A second assembly 18 of ferrite strips 19 located in grooves 20 of a non-magnetic plate 21 is lapped to provide an optically flat surface 22. Spacer stripes 23, for example gold, are deposited on the surface 22, the thickness of the stripes being equal to the desired length of non-magnetic gap between pole pieces in a magnetic head.

The two assemblies are positioned with their optically flat surfaces 12, 22 facing each other and spaced apart by the stripes 23 with the ferrite strips 19 aligned opposite the ferrite strips 10. The two assemblies are bonded together in this relationship by glass which is caused to fill the gap between the faces 12, 22. The bonded assembly is divided subsequently along spaced parallel planes to yield multi track pole piece elements 24 each containing a plurality of spaced pairs of pole pieces, each pair having a non-magnetic transducing gaps aligned along a line 25. The face of the multi track pole piece elements 24 opposite the non-magnetic gaps is lapped optically flat.

A plurality of U shaped ferrite yokes 26 having a coil 27 on one limb are mounted in slots 28 along one edge of a non-magnetic plate 29. A strip of non-magnetic material 30 is bonded to the lower surface of the plate 29 so as to cover the slots 28. The slots 28 have a portion of reduced width in which the other limb of the U shaped yokes is located, the base of the U shaped yoke resting on the strip 30. The yokes 26 are held in position in the plate 29 by a synthetic potting resin. The upper surface 31 of the plate containing the yokes 26 is lapped optically flat and one of the multi track pole piece elements 24 is secured with its lapped face in intimate contact with the surface 31. The yokes 26 are so positioned in the plate 29 that their ends abut with the ends of the pole piece pairs and thereby form, with the pole piece pairs, complete magnetic head cores.

The face of the pole piece elements 24 containing the non-magnetic gaps along line 25 is lapped to a profile suitable for co-operation with a magnetic recording medium.

If desired the plate 29 may be made sufficiently large to act as a carrier for the row of heads and for a pair of profiled pads 32, 33. The profile of the pads 32, 33 and of the heads is such that the whole assembly is supported by a film of entrained air adjacent to but spaced from a magnetic disc surface. A number of plates 29 may be formed by machining grooves in a block and then slicing the block transversely to the grooves.

The pole pieces have been described as being formed from ferrite strips having reduced width portions which have parallel sides, however the grooves may have sloping sides so as to produce strips tapering towards their free edges. Furthermore, the width of the reduced portions may be different in the two assemblies so that one pole piece of each pair is wider, adjacent the gap, than the other pole piece of the pair.

I claim:

1. A method of manufacturing a plurality of magnetic heads including the steps of; providing a support of non-magnetic material; forming a plurality of spaced parallel grooves in the support; bonding ferrite strip elements in said groves thereby to provide an assembly including a plurality of strips of non-magnetic material alternating with strips of ferrite in spaced parallel relationship; machining a plurality of spaced groves in the support parallel to the length of the elements so as to remove material from at least one side wall of each ferrite element; and subsequently dividing the assembly transversely of the length of the strip elements into a plurality of shaped ferrite pieces in said spaced relationship.

2. A method as claimed in claim 1, and including the step of filling the spaced grooves with non-magnetic material in order to support the parts of the ferrite elements of reduced width.

3. A method as claimed in claim 2, in which prior to said dividing operation the assembly is additionally machined in a direction transverse of the ferrite elements the machining being such as to profile at least one edge of said pieces.

4. A method as claimed in claim 1, and including prior to said dividing operation bonding a plurality of second elongate ferrite elements to at least one non-magnetic support to provide a second assembly of ferrite elements arranged in spaced apart parallel arrangement corresponding to the first mentioned parallel arrangement; forming a plurality of spaced grooves in the second support parallel to the length of the second elements so as to remove material from at least one side wall of each second ferrite element; positioning the second assembly and the first mentioned assembly in face to face relationship with the first and second elements in correspondance with each other; bonding the assemblies together with a non-magnetic bonding material; and then dividing both said assemblies in said transverse direction to yield multi-track pole piece units each containing spaced pairs of pole pieces.

5. A method as claimed in claim 4, in which the spaced grooves are filled with non-magnetic material in order to support the parts of the second ferrite elements having a reduced width.

6. A method as claimed in claim 4 and comprising the steps of providing in a further support plate a plurality of slots at one end thereof, said slots being positioned to correspond with the spacing of the ferrite elements; providing a plurality of U-shaped ferrite elements each having two spaced limbs each terminating in an end face; mounting a U-shaped ferrite yoke element in each said slot such that the end faces of the limbs of each yoke are flush with the adjacent surface of the further support plate; and bonding a multi-track pole piece unit to the plate such that the end faces of the yoke limbs abut with the ends of the pole piece pairs and thereby form with the pole piece pairs complete magnetic head cones.

7. A method as claimed in claim 6 in which a strip of non-magnetic material is bonded to said further plate so as to close-off said slots and to provide a support for said yoke elements.

* * * * *